US012609381B2

(12) United States Patent
Lim et al.

(10) Patent No.: US 12,609,381 B2
(45) Date of Patent: Apr. 21, 2026

(54) BATTERY CELL WITH FOLDED MULTILAYER GAS DISCHARGE UNIT AND BATTERY MODULE INCLUDING THE SAME

(71) Applicant: LG Energy Solution, Ltd., Seoul (KR)

(72) Inventors: Hun-Hee Lim, Daejeon (KR);
Sang-Hun Kim, Daejeon (KR);
Min-Hyeong Kang, Daejeon (KR);
Dae-Woong Song, Daejeon (KR);
Hyung-Kyun Yu, Daejeon (KR);
Soo-Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 565 days.

(21) Appl. No.: 18/005,299

(22) PCT Filed: Apr. 26, 2022

(86) PCT No.: PCT/KR2022/005959
§ 371 (c)(1),
(2) Date: Jan. 12, 2023

(87) PCT Pub. No.: WO2022/231277
PCT Pub. Date: Nov. 3, 2022

(65) Prior Publication Data
US 2023/0344043 A1 Oct. 26, 2023

(30) Foreign Application Priority Data

Apr. 26, 2021 (KR) ........................ 10-2021-0053775

(51) Int. Cl.
*H01M 50/14* (2021.01)
*H01M 50/141* (2021.01)
*H01M 50/30* (2021.01)

(52) U.S. Cl.
CPC ....... *H01M 50/141* (2021.01); *H01M 50/394* (2021.01)

(58) Field of Classification Search
CPC ............. H01M 50/141; H01M 50/143; H01M 50/147; H01M 50/148; H01M 50/166;
(Continued)

(56) References Cited

U.S. PATENT DOCUMENTS 10,797,277 B2 * 10/2020 Bhola ................. H01M 50/133
2003/0118900 A1 6/2003 Otohata
(Continued)

FOREIGN PATENT DOCUMENTS

CN 1487613 A 4/2004
CN 205583082 U 9/2016
(Continued)

OTHER PUBLICATIONS

International Search Report for Application No. PCT/KR2022/005959 mailed Aug. 18, 2022, 2 pages.
(Continued)

*Primary Examiner* — Raymond Alejandro
(74) *Attorney, Agent, or Firm* — Lerner David LLP

(57) ABSTRACT

A battery cell includes a battery case having an accommodation portion in which an electrode assembly is mounted, and a sealing portion formed by sealing an outer periphery. A gas discharge unit can be inserted into the sealing portion and fused together with the sealing portion. The gas discharge unit includes a first layer and a second layer in a folded structure about a first border line. The gas discharge unit is open toward the inside of the battery case, and the first layer forms an outer surface of the gas discharge unit. The first layer and the sealing portion being in contact with each other.

15 Claims, 4 Drawing Sheets

(58) Field of Classification Search
CPC ............. H01M 50/167; H01M 50/186; H01M
50/188; H01M 50/197; H01M 50/394;
H01M 50/317; H01M 50/35
See application file for complete search history.

(56) References Cited

U.S. PATENT DOCUMENTS

| | | | |
|---|---|---|---|
| 2004/0038126 A1 | 2/2004 | Gu | |
| 2009/0186270 A1* | 7/2009 | Harada ............... | H01M 50/178 |
| | | | 429/185 |
| 2010/0112436 A1 | 5/2010 | Mizuta et al. | |
| 2011/0076529 A1 | 3/2011 | Mizuta et al. | |
| 2013/0122336 A1 | 5/2013 | Park et al. | |
| 2018/0114964 A1 | 4/2018 | Kim et al. | |
| 2018/0254468 A1 | 9/2018 | Kim et al. | |
| 2022/0102691 A1* | 3/2022 | Wang .................. | H01M 50/224 |
| 2022/0336922 A1 | 10/2022 | Hwang et al. | |
| 2023/0318101 A1 | 10/2023 | Lim et al. | |

FOREIGN PATENT DOCUMENTS

| | | | |
|---|---|---|---|
| CN | 116250131 A | 6/2023 | |
| JP | 2001093489 A | 4/2001 | |
| JP | 2003187762 A | 7/2003 | |
| JP | 2005116235 A | 4/2005 | |
| JP | 2016143524 A | 8/2016 | |
| JP | 2018-530135 A | 10/2018 | |
| KR | 20130099892 A | 9/2013 | |
| KR | 101419570 B1 | 7/2014 | |
| KR | 101462041 B1 | 11/2014 | |
| KR | 20170027150 A | 3/2017 | |
| KR | 101753213 B1 | 7/2017 | |
| KR | 20170103236 A | 9/2017 | |
| KR | 101833540 B1 | 3/2018 | |
| KR | 20190042797 A | 4/2019 | |
| KR | 20210025405 A | 3/2021 | |
| KR | 20210042738 A | 4/2021 | |
| WO | 2009-113634 A1 | 9/2009 | |

OTHER PUBLICATIONS

Extended European Search Report including Written Opinion for Application No. 22796110.9 dated Dec. 17, 2024. 9 pages.
Search Report dated Jul. 28, 2025 from the Office Action for Chinese Application No. 202280006209.1 issued Jul. 29, 2025. 3 pgs.

* cited by examiner

<u>500</u>

510
550

500

500c

B1

A ——————————————— A'

500a

500a

B2'

B1'

510

(a)

500c

500

500d 500a 500b 510

(b)

<u>600</u>

BATTERY CELL WITH FOLDED MULTILAYER GAS DISCHARGE UNIT AND BATTERY MODULE INCLUDING THE SAME

CROSS-REFERENCE TO RELATED APPLICATIONS

The present application is a national phase entry under 35 U.S.C. § 371 of International Application No. PCT/KR2022/005959 filed on Apr. 26, 2022, which claims priority to Korean Patent Application No. 10-2021-0053775 filed on Apr. 26, 2021, in the Republic of Korea, the disclosures of which are incorporated herein by reference in their entirety.

TECHNICAL FIELD

The present disclosure relates to a battery cell and a battery module including the same, and more particularly, to a battery cell capable of suppressing penetration of moisture into the battery cell while having improved external emission of gas generated inside the battery cell, and a battery module including the same.

BACKGROUND ART

As technology development and demand for mobile devices increase, the demand for secondary batteries as an energy source is rapidly increasing. In particular, secondary batteries are of great interest as energy sources not only for mobile devices such as mobile phones, digital cameras, notebooks and wearable devices, but also for power devices such as electric bicycles, electric vehicles and hybrid electric vehicles.

Depending on the shape of a battery case, these secondary batteries are classified into a cylindrical battery and a prismatic battery in which a battery assembly is included in a cylindrical or prismatic metal can, and a pouch-type battery in which the battery assembly is included in a pouch-type case of an aluminum laminate sheet. Here, the battery assembly included in the battery case is a power element including a positive electrode, a negative electrode, and a separator interposed between the positive electrode and the negative electrode, and capable of charging and discharging, and is classified into a jelly-roll type in which long sheet-type positive and negative electrodes coated with an active material are wound with a separator being interposed therebetween, and a stack type in which a plurality of positive and negative electrodes are sequentially stacked with a separator being interposed therebetween.

Among them, in particular, a pouch-type battery in which a stack-type or stack/folding-type battery assembly is included in a pouch-type battery case made of an aluminum laminate sheet is being used more and more due to low manufacturing cost, small weight, and easy modification.

However, as the energy density of the battery cell increases in recent years, there is a problem that the amount of gas generated inside the battery cell also increases. In particular, if the gas generated inside the battery cell is not easily discharged, a venting may occur in the battery cell due to gas generation. Also, even if a separate venting portion is included in the battery cell, moisture may penetrate into the battery cell through the venting portion, which may cause deterioration of battery performance and additional gas generation due to resultant side reactions. Accordingly, there is an increasing need to develop a battery cell capable of preventing penetration of external moisture into the battery cell while having improved external emission of gas generated inside the battery cell.

DISCLOSURE

Technical Problem

The present disclosure is directed to providing a battery cell capable of suppressing penetration of external moisture into the battery cell while having improved external emission of gas generated inside the battery cell, and a battery module including the same.

The object to be solved by the present disclosure is not limited to the above-mentioned object, and the objects not mentioned here may be clearly understood by those skilled in the art from this specification and the accompanying drawings.

Technical Solution

In one aspect of the present disclosure, there is provided a battery cell, comprising: a battery case having an accommodation portion in which an electrode assembly is mounted, and a sealing portion formed by sealing an outer periphery thereof; and a gas discharge unit inserted into the sealing portion and fused together with the sealing portion, wherein the gas discharge unit includes a first layer and a second layer and has a folded structure based on a first border line, the gas discharge unit is opened toward the inside of the battery case, and the first layer becomes an outer surface of the gas discharge unit so that the first layer and the sealing portion come into contact with each other.

The first border line may extend along a width direction of the gas discharge unit.

In the gas discharge unit, a first end and a second end located at both ends based on the first border line may be folded toward the inside of the gas discharge unit based on a second border line, respectively.

The second border line may be in a diagonal direction that intersects the first border line.

The first end and the second end may be located adjacent to an inner side of the sealing portion.

A third end formed in a center portion of the gas discharge unit may be configured to protrude out of the sealing portion.

A fourth end that is an outer end of the gas discharge unit folded by the second border line may be located on the sealing portion.

The battery cell may further comprise an electrode lead electrically connected to an electrode tab included in the electrode assembly and protruding out of the battery case via the sealing portion; and a lead film located at a portion corresponding to the sealing portion in at least one of an upper portion and a lower portion of the electrode lead, wherein the gas discharge unit may be located at an edge of the sealing portion where the electrode lead is not located.

The first layer may contain at least one of polyolefin-based material, epoxy, and polyvinyl chloride (PVC).

The second layer may contain a fluorine-based material.

The gas discharge unit may further include a moisture absorption layer located between the first layer and the second layer.

The moisture absorption layer may include a getter material.

The getter material may include at least one of calcium oxide (CaO), lithium chloride (LiCl), silica ($SiO_2$), barium oxide (BaO), barium (Ba), and calcium (Ca).

The getter material may have a structure of metal organic framework (MOF).

In another aspect of the present disclosure, there is also provided a battery module, comprising the battery cell described above.

Advantageous Effects

According to embodiments, the present disclosure provides a battery cell including a gas discharge unit having a multilayer structure and folded based on a predetermined border line, and a battery module including the same, and thus may improve the external discharge of gas generated inside the battery cell and suppress the penetration of moisture into the battery cell.

The effect of the present disclosure is not limited to the above effects, and the effects not mentioned here will be clearly understood by those skilled in the art from this specification and the accompanying drawings.

BEST MODE

Figure 1:
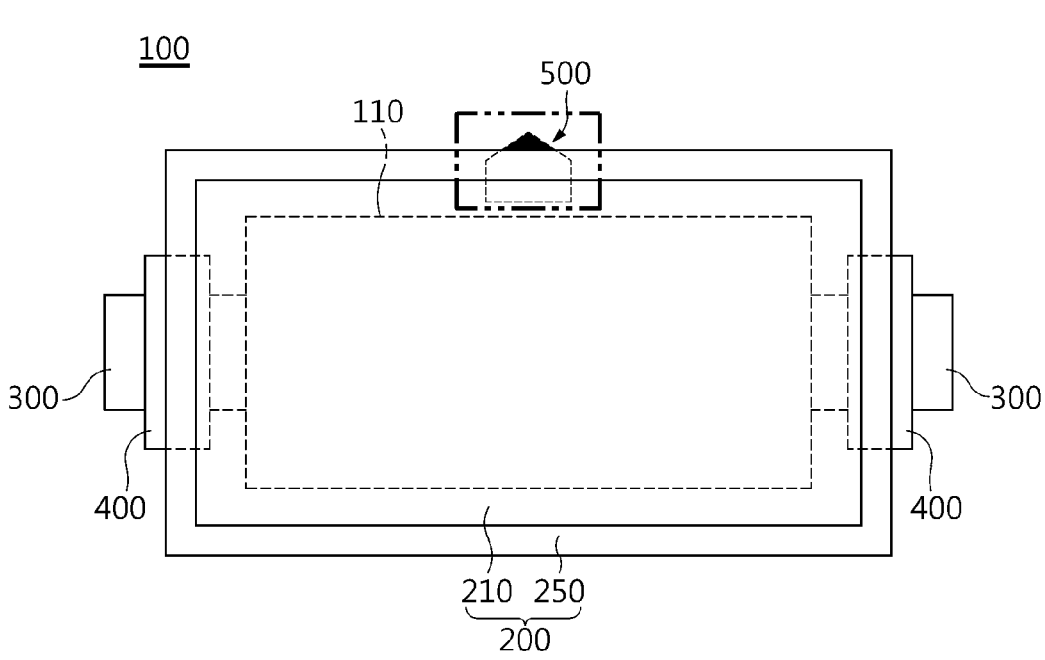
FIG. 1 is a top view of a battery cell according to an embodiment of the present disclosure.

Hereinafter, with reference to the accompanying drawings, various embodiments of the present disclosure will be described in detail so as to be easily implemented by those skilled in the art. The present disclosure may be implemented in various different forms and is not limited to the embodiments described herein.

In order to clearly explain the present disclosure, parts irrelevant to the description are omitted, and identical or similar components are endowed with the same reference signs throughout the specification.

In addition, since the size and thickness of each component shown in the drawings are arbitrarily expressed for convenience of description, the present disclosure is not necessarily limited to the drawings. In order to clearly express various layers and regions in the drawings, the thicknesses are enlarged. Also, in the drawings, for convenience of explanation, the thickness of some layers and regions is exaggerated.

In addition, throughout the specification, when a part "includes" a certain component, it means that other components may be further included, rather than excluding other components, unless otherwise stated.

In addition, throughout the specification, when referring to "top view", it means that the target part is viewed from above, and when referring to "cross-sectional view", it means that a vertically-cut section of the target part is viewed from a side.

FIG. 1 is a diagram showing a battery cell according to an embodiment of the present disclosure.

Referring to FIG. 1, the battery cell 100 according to an embodiment of the present disclosure includes a battery case 200 having an accommodation portion 210 in which an electrode assembly 110 is mounted, and a sealing portion 250 formed by sealing an outer periphery thereof; and a gas discharge unit 500 inserted into the sealing portion 250 and fused together with the sealing portion 250. The sealing portion 250 may be sealed by heat, laser, or the like. In addition, the sealing portion 250 and the gas discharge unit 500 may be fused by heat, laser, or the like.

The battery case 200 may be a laminate sheet including a resin layer and a metal layer. More specifically, the battery case 200 may be made of a laminate sheet, and may include an outer resin layer forming the outermost layer, a barrier metal layer preventing penetration of materials, and an inner resin layer for sealing.

The electrode assembly 110 may have a structure of a jelly-roll type (winding type), a stack type (lamination type), or a composite type (stack/folding type). More specifically, the electrode assembly 110 may include a positive electrode, a negative electrode, and a separator disposed therebetween.

The electrode lead 300 is electrically connected to an electrode tab (not shown) included in the electrode assembly 110, and protrudes out of the battery case 200 via the sealing portion 250. In addition, the lead film 400 is located at a portion corresponding to the sealing portion 250 in at least one of an upper portion and a lower portion of the electrode lead 300. Accordingly, the lead film 400 may improve the sealing properties of the sealing portion 250 and the electrode lead 300 while preventing a short circuit from occurring in the electrode lead 300 during fusion.

The lead film 400 may have a wider width than the electrode lead 300. The lead film 400 may have a greater length than the sealing portion 250, but may have a smaller length than the electrode lead 300. Accordingly, the lead film 400 may prevent the side surface of the electrode lead 300 from being exposed to the outside without interfering with the electrical connection of the electrode lead 300. In this specification, the width of the lead film 400 refers to a maximum value of the distance between one end and the other end of the lead film 400 based on the direction perpendicular to the protruding direction of the electrode lead 300, and the width of the electrode lead 300 refers to a maximum value of the distance between one end and the other end of the electrode lead 300 based on the direction perpendicular to the protruding direction of the electrode lead 300. The length of the lead film 400 refers to a maximum value of the distance between one end and the other end of the lead film 400 based on the protruding direction of the electrode lead 300, and the length of the sealing portion 250 refers to a maximum value of the distance between one end and the other end of the sealing portion 250 based on the protruding direction of the electrode lead 300. The length of the electrode lead 300 refers to a maximum value of the distance between one end and the other end of the electrode lead 300 based on the protruding direction of the electrode lead 300.

The gas discharge unit 500 may be inserted into at least a part of the sealing portion 250. More specifically, as shown in FIG. 1, the gas discharge unit 500 may be located in the outer periphery of the sealing portion 250 where the electrode lead 300 is not located. In other words, the gas discharge unit 500 may be inserted into the sealing portion 250 adjacent to a side of the electrode assembly 110. Accordingly, the gas discharge unit 500 may sufficiently secure a gas discharge path by the gas discharge unit 500 without interfering with the electrical connection of the electrode lead 300.

As another example, although not specifically shown in the drawings, the gas discharge unit 500 may be located in the outer periphery of the sealing portion 250 where the electrode lead 300 is located. In other words, the gas discharge unit 500 may be located in the same outer periphery as the electrode lead 300, but spaced apart from the electrode lead 300. Accordingly, since the gas discharge unit 500 protrudes in the same direction as the electrode lead 300, there is an advantage in that the space efficiency of the battery cell 100 may be further improved.

Hereinafter, the gas discharge unit 500 will be described in more detail.

Figure 2:
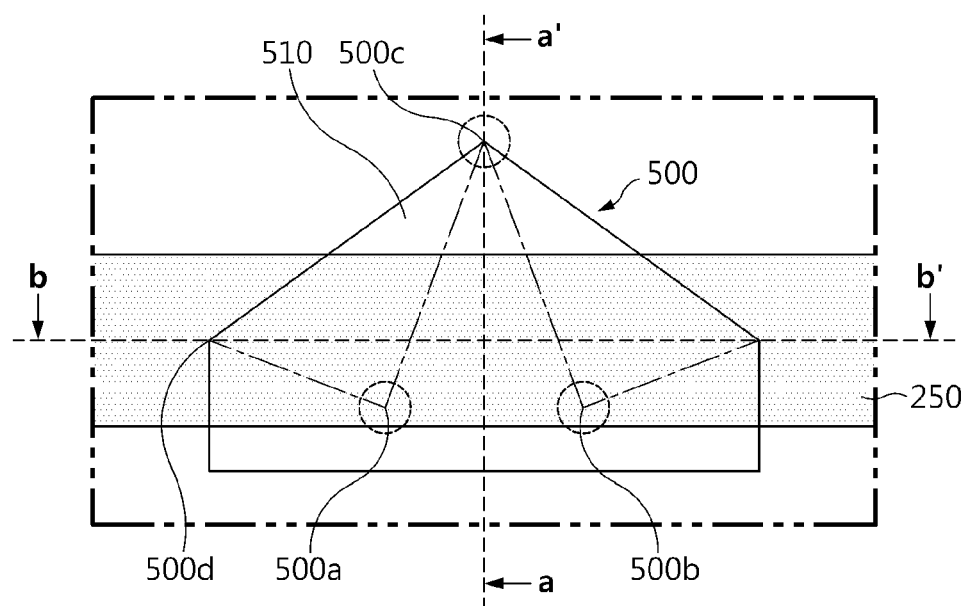
FIG. 2 is an enlarged view showing a part of FIG. 1.
Figures 3, 4A, 4B:
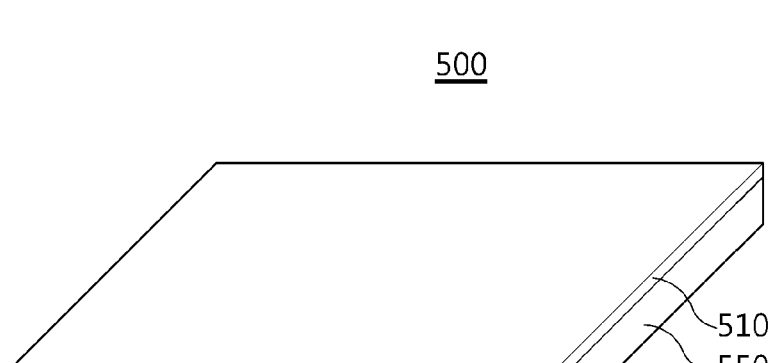
FIG. 3 is an isometric view of a gas discharge unit of FIG. 1.
FIG. 4A is a schematic first view of a folded structure of the gas discharge unit of FIG. 1.
FIG. 4B is a schematic second view of the folded structure of the gas discharge unit of FIG. 1.

FIG. 2 is an enlarged view showing a part of FIG. 1. FIG. 3 is a diagram showing the configuration of a gas discharge unit of FIG. 1. FIGS. 4A and 4B show folded structures of the gas discharge unit of FIG. 1.

Referring to FIGS. 2 and 3, the gas discharge unit 500 may include a first layer 510 and a second layer 550. More specifically, the gas discharge unit 500 may be made of a film in which the first layer 510 and the second layer 550 are laminated.

Here, the first layer 510 may be an adhesive layer that may be adhered by fusion. More specifically, the first layer 510 may include at least one of a polyolefin-based material, an epoxy, and polyvinyl chloride (PVC). For example, the polyolefin-based material may be polyethylene (PE), polypropylene (PP), or the like.

In addition, the second layer 550 may be a non-adhesive layer that cannot be adhered by fusion. More specifically, the second layer 550 may include a fluorine-based material. For example, the fluorine-based material may be polytetrafluoroethylene (PTFE), polymethylpentene (TPX), or the like.

Accordingly, as shown in FIGS. 2 and 4, the gas discharge unit 500 has a structure in which the first layer 510 is folded to become an outer surface of the gas discharge unit 500, and thus the first layer 510 is fused together with the sealing portion 250 so as to be adhered thereto. Alternatively, the second layer 550 is folded to become an inner surface of the gas discharge unit 500, but the second layers 550 facing each other are not fused to each other, so that the inside of the gas discharge unit 500 may become a gas discharge passage.

The second layer 550 may have an adhesive material between the first layer 510 and the second layer 550 or may be extruded together with the first layer 510. The adhesive material may include an acryl-based material.

As gas is generated inside the battery and the pressure inside the battery increases, the gas may be introduced into an interface between the second layers 550 facing each other to form a space between the second layers 550. Due to the introduced gas, a pressure difference may occur between the space inside the gas discharge unit 500 and the outside of the battery. This pressure difference may act as a driving force of the gas, so that the gas inside the gas discharge unit 500 may be discharged to the outside.

In this specification, the gas permeability may be measured by ASTM F2476-20.

The gas permeability of the second layer 550 may be 1.6 $e^5$ Barrer to 1.6 $e^7$ Barrer at 60° C. For example, the carbon dioxide permeability may satisfy the above range. In addition, the gas permeability may satisfy the above range at 60° C. based on the thickness of the second layer 550 of 200 μm. If the gas permeability of the second layer 550 satisfies the above range, the gas generated inside the battery cell may be more effectively discharged.

Referring to FIG. 4A is a diagram showing a border line along which the gas discharge unit 500 is folded based on the upper surface of the film on which the first layer 510 and the second layer 550 are laminated. FIG. 4B is a diagram showing a structure in which the gas discharge unit 500 is folded along the border line of FIG. 4A. However, the first layer 510 is shown as a center, and the second layer 550 located on the lower surface of FIG. 4a is not depicted, and the second layer 550 located on the inner surface of the gas discharge unit 500 of FIG. 4b is not depicted.

Referring to FIGS. 2 and 4A, the gas discharge unit 500 may have a folded structure based on a first border line A-A'. The first border line A-A' may extend along the width direction of the gas discharge unit 500. In this specification, the width direction of the gas discharge unit 500 refers to a longitudinal direction of the sealing portion 250. More specifically, as shown in FIG. 4A, the first border line A-A' may be a center line of the film on which the first layer 510 and the second layer 550 are laminated based on the horizontal direction.

Accordingly, the gas discharge unit 500 may be folded based on the first border line A-A', so that the first layer 510 may form upper and lower surfaces of the gas discharge unit 500. That is, the sealing degree between the gas discharge unit 500 and the sealing portion 250 may be improved due to the first layer 510 located on the upper and lower surfaces of the gas discharge unit 500.

In addition, referring to FIG. 4B, the first end 500*a* and the second end 500*b* of the gas discharge unit 500 located at both ends based on the first border line A-A' may be folded toward the inside of the gas discharge unit 500 based on the second border lines B1-B1', B2-B2', respectively. More specifically, as shown in FIG. 4a, the second border line B1-B1', B2-B2' may be in a diagonal direction that intersects the first border line A-A'.

In addition, the first end 500*a* and the second end 500*b* of the gas discharge unit 500 may be located inside the sealing portion 250. For example, as shown in FIG. 2, the first end 500*a* and the second end 500*b* of the gas discharge unit 500 may be located adjacent to the inner side of the sealing portion 250. The inner side of the sealing portion 250 refers to an end close to the electrode assembly among the ends of the sealing portion 250.

In addition, the gas discharge unit 500 may adjust the angles of the second border lines B1-B1', B2-B2' to change the positions of the first end 500*a* and the second end 500*b*. For example, the angle of the second border line B1-B1', B2-B2' may be less than 45°. When the angle of the second border line B1-B1', B2-B2' satisfies the above-mentioned range, the gas moving passage may be secured more easily.

In addition, the gas discharge unit 500 may adjust the positions of the first end 500*a* and the second end 500*b* according to the position inserted into the sealing portion 250. Referring to FIG. 2, a fourth end 500*d* that is an outer end of the gas discharge unit folded by the second border line may be located on the sealing portion 250. That is, the fourth end 500*d* may be located between the outer side and the inner side of the sealing portion 250. Here, the outer side of the sealing portion 250 refers to an end of the sealing portion 250 in the outer direction of the battery. When the fourth end 500*d* is located on the sealing portion 250, the gas discharge unit 500 may be fixed on the sealing portion 250 more easily.

Accordingly, the gas discharge unit 500 is folded based on the second border line B1-B1', B2-B2', so that the first layer 510 may form a side surface of the gas discharge unit 500. That is, the sealing degree between the gas discharge unit 500 and the sealing portion 250 may be further improved due to the first layer located on both sides of the gas discharge unit 500.

In addition, since the second layer 550 may not be exposed to the outside, it is possible to prevent moisture out of the battery cell 100 from penetrating into the inside. In addition, since the gas discharge unit 500 of the present disclosure has a structure folded based on a predetermined border line, a manufacturing process may also be relatively easy.

The water penetration amount of the first layer 510 may be 0.02 g to 0.2 g, or 0.02 g to 0.04 g, or 0.06 g, or 0.15 g for 10 years at 25° C., 50% RH. When the moisture penetration amount of the first layer 510 satisfies the afore-mentioned range, it is possible to more effectively prevent penetration of moisture introduced from the gas discharge unit 500.

In this specification, the moisture penetration amount may be measured by adopting the ASTM F 1249 method. At this time, the moisture penetration amount may be measured using equipment officially certified by MCOON.

However, in addition to the folding structure as shown in FIG. 4, if the gas discharge unit 500 of the present disclosure is folded in such a way that the second layer 550 may not be exposed to the outside, it may be included in this embodi-ment.

Figure 5:
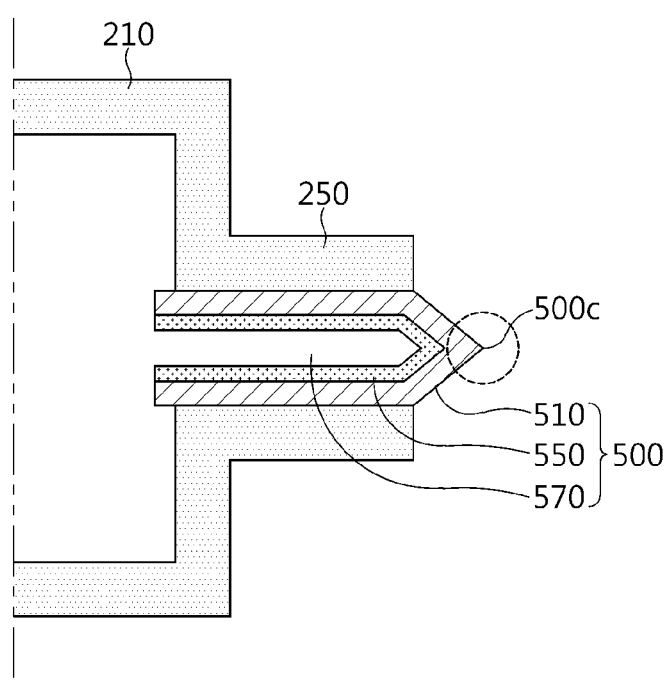
FIG. 5 is a partial cross-sectional view, taken along the axis a-a' of FIG. 2.
Figure 6:
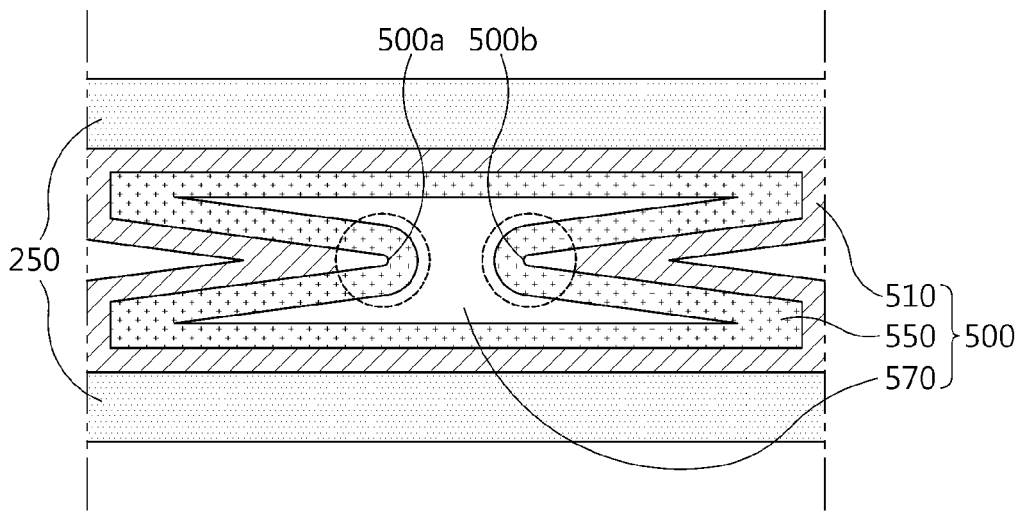
FIG. 6 is a partial cross-sectional view, taken along the axis b-b' of FIG. 2.

FIG. 5 is a partial cross-sectional view, taken along the axis a-a' of FIG. 2. FIG. 6 is a partial cross-sectional view, taken along the axis b-b' of FIG. 2.

Referring to FIGS. 2 and 5, in this embodiment, the gas discharge unit 500 is opened toward the inside of the battery case 200, and the first layer 510 becomes an outer surface of the gas discharge unit 500, so that the first layer 510 and the sealing portion 250 may come into contact with each other. In addition, the second layer 550 becomes an inner surface of the gas discharge unit 500, and a gas discharge passage 570 may be formed between the second layers 550.

Accordingly, in this embodiment, the gas inside the battery cell 100 may be introduced into the gas discharge passage 570 of the gas discharge unit 500 formed between the second layers 550, and the gas introduced into the gas discharge passage 570 may be discharged to the outside according to the pressure difference with the outside.

The third end 500c formed in the center portion of the gas discharge unit 500 may protrude out of the sealing portion 250. Also, in this embodiment, according to the position of the third end 500c, it is possible to adjust the discharge degree of the gas introduced into the gas discharge passage 570. For example, when the third end 500c is located adjacent to the outer side of the sealing portion 250, the area in which the gas introduced into the gas discharge passage 570 can be discharged to the outside is relatively small, so that the degree of discharge of the gas introduced into the gas discharge passage 570 may be reduced. As another example, when the third end 500c is spaced apart from the outer side of the sealing portion 250, the area in which the gas introduced into the gas discharge passage 570 can be dis-charged to the outside is relatively large, so that the degree of discharge of the gas introduced into the gas discharge passage 570 may be increased.

The thickness of the gas discharge unit 500 may vary according to an area in which the gas introduced into the gas discharge passage 570 can be discharged to the outside. The thickness of the gas discharge unit 500 may be determined in consideration of gas permeation efficiency and sealing characteristics at the same time. For example, when the area through which the gas introduced into the gas discharge passage 570 can be discharged to the outside is small, it may be more advantageous for gas discharge that the thickness of the gas discharge unit 500 is thin while having a thickness sufficient to be fused with the sealing portion 250.

In one embodiment of the present disclosure, the thick-ness of the first layer 510 may be 10 μm to 50 μm. When the thickness of the first layer 510 satisfies the above-described range, the first layer 510 may be more easily fused with the sealing portion 250, and the gas generated inside the battery cell may be more easily discharged.

In one embodiment of the present disclosure, the thick-ness of the second layer 550 may be 100 μm to 300 μm. When the thickness of the second layer 550 satisfies the aforementioned range, the gas generated inside the battery cell may be more easily discharged.

Referring to FIGS. 2 and 6, in this embodiment, the first end 500a and the second end 500b of the gas discharge unit 500 may be folded toward the inside of the gas discharge unit 500 as shown in FIG. 6. However, although the structure of the gas discharge unit 500 is exaggerated in FIG. 6, the upper and lower portions of the gas discharge unit 500 are fused, so that the first layers 510 located on the outer surface of the gas discharge unit 500 may be in contact with each other, or the sealing portion 250 may be partially introduced between the first layers 510.

Accordingly, both sides of the gas discharge unit 500 may use the first layer 510 as the outer surface, thereby improv-ing the sealing degree between the sealing portion 250 and the gas discharge unit 500. Moreover, since the second layer 550 may not be exposed to the outside, it is possible to prevent moisture out of the battery cell 100 from penetrating into the inside. In addition, the area of the second layer 550 formed on the inner surface of the gas discharge unit 500 may be relatively large, so that the discharge amount of gas introduced into the gas discharge passage 570 may be increased.

Figure 7:
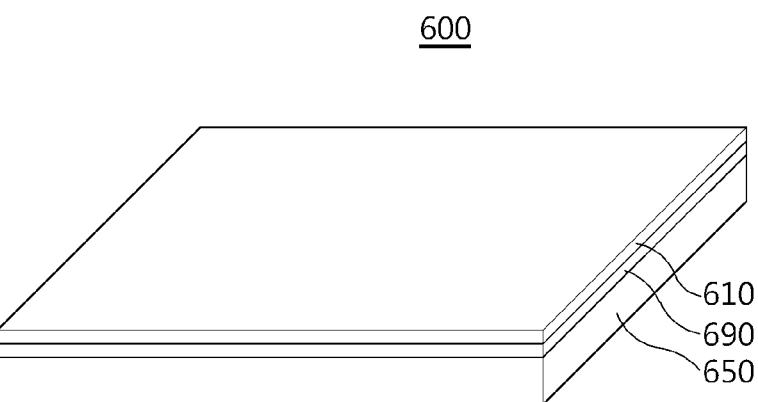
FIG. 7 is an isometric view of a gas discharge unit according to another embodiment of the present disclosure.

FIG. 7 is a diagram showing the configuration of a gas discharge unit according to another embodiment of the present disclosure.

According to another embodiment of the present disclo-sure, the gas discharge unit 600 may include a first layer 610, a second layer 650, and a moisture absorption layer 690. Here, the moisture absorption layer 690 may be located between the first layer 610 and the second layer 650. More specifically, the gas discharge unit 600 may be made of a film in which the first layer 610, the moisture absorption layer 690 and the second layer 650 are laminated.

Here, the first layer 610 and the second layer 650 may be described in the same manner as previously described in FIGS. 1 to 6, so only the moisture absorption layer 690 will be described in detail below.

The moisture absorption layer 690 may be a layer having a moisture absorption function. More specifically, the mois-ture absorption layer 690 may include a getter material. Here, the getter material may refer to a material capable of evacuating a gas using the action that gas is absorbed by a chemically activated metal film. For example, the getter material may include at least one of calcium oxide (CaO), lithium chloride (LiCl), silica ($SiO_2$), barium oxide (BaO), barium (Ba), and calcium (Ca). As another example, the getter material may have a structure of a metal organic framework (MOF). However, the getter material is not limited thereto, and may include all kinds of materials generally classified as getter materials.

Accordingly, as shown in FIGS. 4 and 7, the moisture absorption 690 is located between the first layer 610 and the second layer 650, and the gas discharge unit 500 may further minimize the penetration of moisture introduced into the battery cell 100 from the outside of the battery cell 100 and allow the gas to be more easily discharged to the outside due to the high gas permeability.

In addition, a battery module according to another embodiment of the present disclosure includes the battery cell described above. Meanwhile, one or more battery modules according to this embodiment may be packaged in a pack case to form a battery pack.

The battery module described above and the battery pack including the same may be applied to various devices. These devices may be transportation means such as electric bicycles, electric vehicles, hybrid electric vehicles, and the like, but the present disclosure is not limited thereto, and the present disclosure may be applied various devices that can use a battery module and a battery pack including the same, which is also within the scope of the right of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery cell, comprising:
   a battery case having an accommodation portion with an electrode assembly mounted therein, and a sealing portion around an outer periphery of the battery case; and
   a gas discharge unit disposed in the sealing portion and fused together with the sealing portion,
   wherein the gas discharge unit includes a first layer and a second layer arranged to define a folded structure folded about a first border line of the gas discharge unit such that the gas discharge unit is opened to an interior of the battery case, and the first layer defines an outer surface of the gas discharge unit in contact with the sealing portion.

2. The battery cell according to claim 1, wherein the first border line extends along a width direction of the gas discharge unit.

3. The battery cell according to claim 2, wherein a first end and a second end located at ends of the first border line are folded toward an inside of the gas discharge unit along second border lines.

4. The battery cell according to claim 3, wherein the second border lines extend diagonally and intersect the first border line at a common point.

5. The battery cell according to claim 3, wherein the first end and the second end are located adjacent to an inner side of the sealing portion.

6. The battery cell according to claim 5, wherein a third end formed in a center portion of the gas discharge unit is configured to protrude away from the sealing portion.

7. The battery cell according to claim 6, wherein a fourth end defined by an outer end of the gas discharge unit folded by the second border lines is located on the sealing portion.

8. The battery cell according to claim 1, further comprising:
   an electrode lead electrically connected to an electrode tab of the electrode assembly, the electrode lead protruding out of the battery case via the sealing portion; and
   a lead film located at a portion corresponding to a first edge of the sealing portion in at least one of an upper portion and a lower portion of the electrode lead,
   wherein the gas discharge unit is located at a second edge of the sealing portion, the second edge being different from the first edge.

9. The battery cell according to claim 1, wherein the first layer contains at least one of polyolefin-based material, epoxy, and polyvinyl chloride (PVC).

10. The battery cell according to claim 1, wherein the second layer contains a fluorine-based material.

11. The battery cell according to claim 1, wherein the gas discharge unit further includes a moisture absorption layer located between the first layer and the second layer.

12. The battery cell according to claim 11, wherein the moisture absorption layer includes a getter material.

13. The battery cell according to claim 12, wherein the getter material includes at least one of calcium oxide (CaO), lithium chloride (LiCl), silica ($SiO_2$), barium oxide (BaO), barium (Ba), and calcium (Ca).

14. The battery cell according to claim 12, wherein the getter material has a structure of a metal organic framework (MOF).

15. A battery module, comprising the battery cell according to claim 1.

* * * * *